United States Patent [19]

Bommaraju et al.

[11] 4,444,631
[45] Apr. 24, 1984

[54] ELECTROCHEMICAL PURIFICATION OF CHLOR-ALKALI CELL LIQUOR

[75] Inventors: Tilak V. Bommaraju; Charles G. Rader, both of Grand Island, N.Y.

[73] Assignee: Occidental Chemical Corporation, Niagara Falls, N.Y.

[21] Appl. No.: 287,967

[22] Filed: Jul. 29, 1981

Related U.S. Application Data

[63] Continuation-in-part of Ser. No. 262,375, May 11, 1981, abandoned.

[51] Int. Cl.³ .................. C25B 1/26; C25B 9/00; C25B 11/03; C25B 11/08
[52] U.S. Cl. ...................... 204/95; 204/98; 204/128; 204/222; 204/258; 204/266; 204/283; 204/284; 204/292; 204/291; 204/296; 204/130
[58] Field of Search ............ 204/95, 98, 258, 266, 204/282–284, 292, 222, 296, 130, 128, 291

[56] References Cited

U.S. PATENT DOCUMENTS

| | | | |
|---|---|---|---|
| 3,969,201 | 7/1976 | Oloman et al. | 204/222 X |
| 4,090,931 | 5/1978 | Motani et al. | 204/283 X |
| 4,126,534 | 11/1978 | Boulton | 204/266 |
| 4,127,457 | 11/1978 | Krumpelt et al. | 204/98 |
| 4,147,600 | 4/1979 | Rutherford et al. | 204/98 |
| 4,170,536 | 10/1979 | Kawasaki et al. | 204/98 X |
| 4,197,179 | 4/1980 | Ezzell et al. | 204/258 X |
| 4,230,544 | 10/1980 | McRae | 204/258 |
| 4,246,078 | 1/1981 | Broniewski | 204/98 |
| 4,313,805 | 2/1982 | Burney et al. | 204/98 |

Primary Examiner—Donald R. Valentine
Attorney, Agent, or Firm—James F. Tao; William G. Gosz

[57] ABSTRACT

An apparatus is provided for reducing the amount of alkali metal chlorate present in the cell liquor from a chlor-alkali cell, said apparatus comprising an electrochemical cell having at least one cathode element and one anode element, a cationic exchange membrane disposed between the anode and cathode elements, and an inlet for introducing chlorate-containing cell liquor and an outlet for removing purified cell liquor, inlet and outlet means for anolyte solution, and means for removing gaseous reaction products. The cathode element of said electrochemical cell is of a high surface area construction, preferably formed from compressed filaments of a ferrous material, such as iron or steel, and having sufficient porosity to permit the flow of cell liquor through the cathode. Preferably, when a plurality of anode and cathode elements are used, these elements are arranged in a staggered configuration in the apparatus to maximize the flow path of alkali metal chloride cell liquor through the apparatus. The purified cell liquor product of said electrochemical cell has a significantly reduced alkali metal chlorate content.

20 Claims, 2 Drawing Figures

ELECTROCHEMICAL PURIFICATION OF CHLOR-ALKALI CELL LIQUOR

CROSS-REFERENCE TO RELATED APPLICATIONS

This is a continuation-in-part of copending application Ser. No. 262,375, filed May 11, 1981, now abandoned.

BACKGROUND OF THE INVENTION

The present invention relates to an electrochemical apparatus for reducing the alkali metal chlorate content of the liquor product of a chlor-alkali cell. The apparatus of this invention can be suitably employed in a commercial scale chlor-alkali plant utilizing a large number of chlor-alkali cells and a multi-stage caustic evaporator.

A typical electrolytic cell for the eletrolysis of aqueous alkali metal chloride solutions is an enclosed container physically partitioned into at least two distinct regions or chambers by means of an intermediate barrier or cell separator. The separator can either be a porous member, such as an asbestos diaphragm, a polymer-reinforced asbestos diaphragm, or a synthetic microporous separator, or alternatively, an impermeable ion exchange membrane. In an electrolytic diaphragm cell containing a porous separator spaced between alternating anodes and cathodes, the cathode compartment contains an electrolytic solution, i.e. catholyte, which, for a commercial scale cell, contains approximately 12%–17% of sodium hydroxide, 15%–20% of sodium chloride, and 0.5 g./l.–0.6 g./l. of sodium chlorate.

A portion of the catholyte, e.g. 6–10 gal./min. for a Hooker H-4 cell, is continuously removed from the cell as cell liquor product and purified and concentrated by the evaporation of water in multi-stage evaporation equipment.

Commercial evaporators for concentrating the cell liquor generally operate at elevated temperatures and under elevated pressure conditions utilizing steam as a heat source to produce caustic soda having a concentration of 50% or more. Such evaporators are generally fabricated of nickel or iron-based alloys such as E-brite. Under these evaporation conditions, a sodium chlorate concentration in the cell liquor feed to the evaporator of as little as 0.5 g./l. to 0.6 g./l. can severely corrode the internal evaporator surfaces and the internal surfaces of other metal components associated with the evaporation of the cell liquor. Although it has been suggested that such surfaces and components can be fabricated from titanium which is more resistant to this type of corrosion than nickel, the cost of fabricating such titanium components tends to be prohibitively high.

In addition to the corrosion problems associated with the presence of sodium chlorate in the cell liquor, sodium chlorate also represents an impurity or contaminant for certain end uses of the concentrated caustic soda, such as in the manufacture of rayon.

Various attempts have been made in the past to reduce the sodium chlorate concentration in chlor-alkali cell liquor prior to evaporation.

U.S. Pat. No. 3,380,806, issued Apr. 30, 1968, discloses a process for reducing the chlorate content of chlorate-containing solutions by adding sorbitol or glycerin to the solution and heating the solution to a temperature above about 100° C. The sorbitol and/or glycerin reacts with the sodium chlorate under these conditions to produce sodium chloride, water, carbon dioxide and carbon monoxide.

Another process for reducing the chlorate content of chlorate-containing solutions is disclosed in Netherland Patent Application No. 7,603,314, published Oct. 4, 1977, wherein hydrogen is reacted with the solution under high temperature and pressure conditions in the presence of a carbon-supported ruthenium catalyst to produce sodium chloride and water as illustrated by the following reaction:

$$NaClO_3 + 3H_2 \xrightarrow{Ru/C} NaCl + 3H_2O \qquad (1)$$

Although the prior art discloses various methods of reducing the chlorate content of the alkali metal chloride cell liquor product, such methods tend to rely on chemical treatment employing elevated temperature and/or pressure conditions coupled with the use of expensive catalysts or chemical systems, such as shown in equation (1). The present invention represents a departure from the prior art since an electrochemical system is utilized to achieve chlorate content reductions at least comparable to those of the prior art using less expensive materials and lower capital and operating costs.

SUMMARY OF THE INVENTION

In accordance with the present invention, an electrochemical apparatus and method are provided for reducing the chlorate content of cell liquor from a chlor-alkali cell. The apparatus comprises an electrochemical cell having at least one cathode element and one anode element, preferably at least one ion exchange membrane disposed between the anode and cathode elements, an inlet means for introducing cell liquor containing concentrations of sodium chlorate into the apparatus and an outlet means for removing purified cell liquor from the apparatus, inlet and outlet means for anolyte solution, and means for removing gaseous reaction products. The cathode element is preferably a high surface area structure formed from a ferrous material, such as iron or steel, and is sufficiently porous to permit the flow of cell liquor through it. Preferably, when a plurality of anode and cathode elements are employed, the anodes are arranged in a staggered configuration to maximize the flow path of cell liquor through the electrochemical apparatus.

BRIEF DESCRIPTION OF THE DRAWINGS

The accompanying drawings further illustrate a particular embodiment of the present invention.

DETAILED DESCRIPTION OF THE INVENTION

Figure 1:
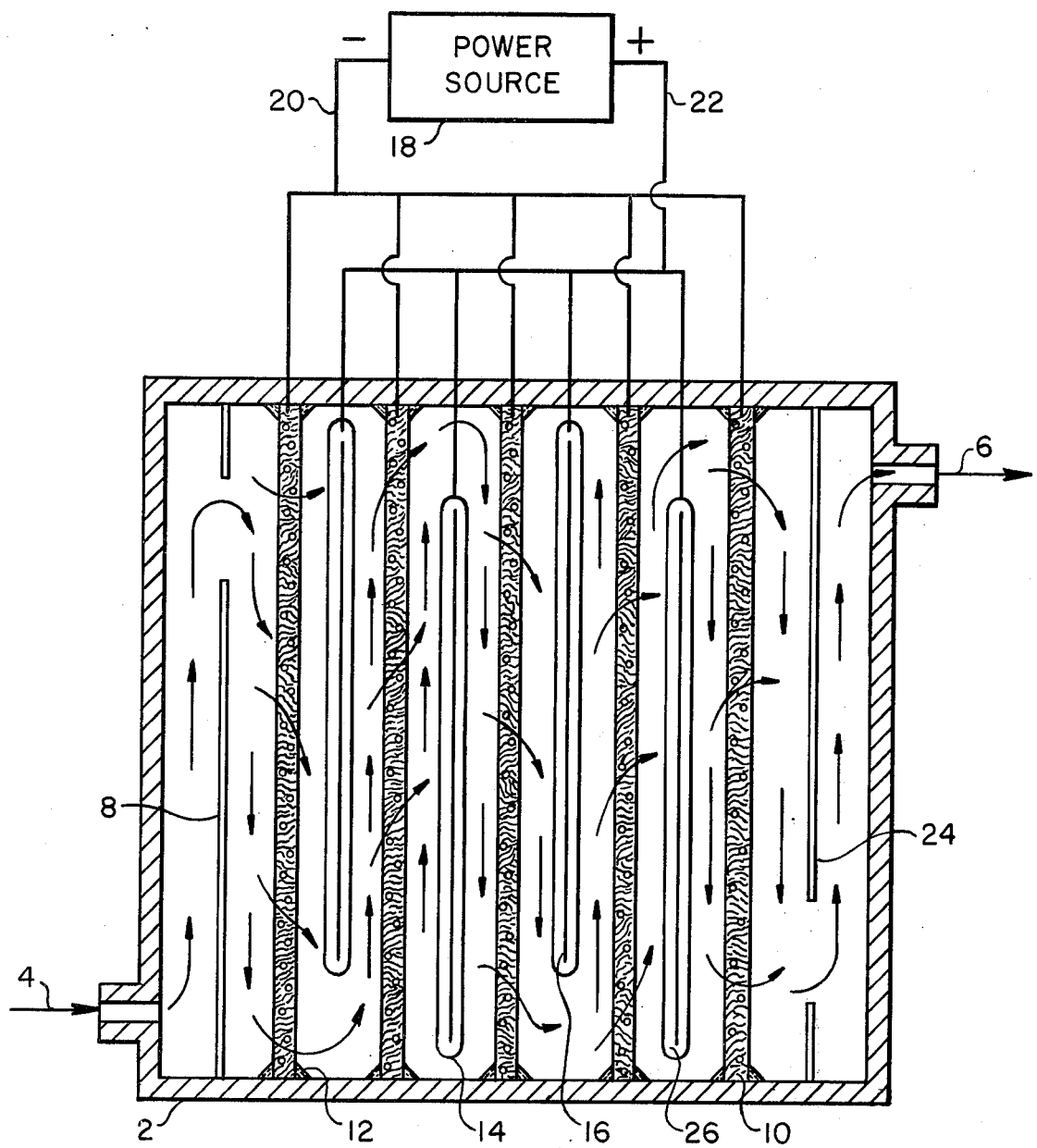
FIG. 1 is a cross-sectional top view of one embodiment of the electrochemical apparatus of the present invention.

The electrochemical apparatus of this invention comprises a cell container having at least one anode element and one cathode element, preferably at least one ion exchange membrane disposed between the anode and cathode elements, an inlet means for receiving cell liquor from at least one chlor-alkali diaphragm cell, and an outlet means for removing purified cell liquor for evaporation in a multi-stage caustic evaporator. By "purified cell liquor" is meant, in the context of the present invention, cell liquor having a significantly reduced content of sodium chlorate.

The individual anode elements which can be used in this invention are fabricated from materials well known to those skilled in the art. Typically, such anodes comprise an electrically conductive substrate material, such as, for example, a valve metal such as titanium, containing on its surface an electrically conductive, electrocatalytic coating which may comprise a noble metal, noble metal oxide, e.g. a dimensionally stable anode, or other suitable metals such as iron or nickel. The physical form of the anode is generally a foraminated sheet or mesh of the valve metal coated with the electrocatalytic coating.

An ion exchange membrane, which preferably separates the anode and cathode elements and defines at least part of the anode compartment, can be fabricated from an anionic or cationic exchange material. Cationic exchange materials which are suitable include various fluoropolymers, such as polytetrafluoroethylene, which have the ability to allow the transport of ions through its surface. A typical ion exchange membrane which is useful in practicing the present invention is a Nafion ®-type membrane manufactured by the E. I. duPont de Nemours & Co., Wilmington, Del. Membranes of this type are commonly used in a variety of electrolytic processes and are well known to those skilled in the art.

The need for an ion exchange membrane can be obviated, however, by utilizing anode elements fabricated from either iron or nickel. In this particular embodiment, oxygen is evolved at the anode and removed from the cell.

Although flat plates or screens can be suitably employed as the individual cathode elements, these elements preferably have a high effective surface area and are sufficiently porous to permit the flow of the chlor-alkali cell liquor completely through the cathode from one face to the other. Physically, a highly porous cathode structure can be formed by compressing filaments or wires of a ferrous material, or by forming a fluidized bed of spherical particles of a ferrous material between a suitable retaining screen. The structure thus formed is porous to the flow of cell liquor through the structure and presents a high surface area for fluid contact. The cathode can be formed from any electroconductive material, although ferrous materials have been found extremely effective for this purpose. Suitable ferrous materials include, for purposes of this invention, iron, iron alloys, iron oxides, or combinations thereof. Specific examples include steel, FeO, $Fe_2O_3$ and $Fe_3O_4$. The individual cathode elements are preferably of a thickness of from about 0.1 millimeters to about 50 millimeters.

It has been found that the overvoltage impressed on the cathode has a significant effect on the efficiency of the chlorate reduction reaction. This reaction can be illustrated as follows:

(2) 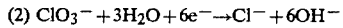 $ClO_3^- + 3H_2O + 6e^- \rightarrow Cl^- + 6OH^-$

At cathodic hydrogen overvoltages of more than about 300 millivolts, however, the electrolysis of water, which produces hydrogen and hydroxyl ions, competes with reaction (2) and may become the predominant reaction. Accordingly, by maintaining the cathodic hydrogen overvoltage at less than about 300 millivolts, and preferably less than about 150 millivolts, the electrolysis of water can become thermodynamically and/or kinetically insignificant on the cathode surface, and the electrochemical reduction of sodium chlorate as shown in reaction (2) predominates.

Inlet and outlet means are also provided for feeding and withdrawing anolyte solution from the anode compartment of the cell when an ion exchange membrane is used. The anolyte solutiom can be either an aqueous solution of sodium chloride or sodium hydroxide, with the sodium chloride or sodium hydroxide being present in amounts of up to the saturation level. The anolyte is preferably continuously circulated through the anode compartment to maintain the level of anolyte solution.

In one embodiment of the present invention, the chlorate reduction can be conducted in a batch-type process without circulation of the chlor-alkali cell liquor through the electrochemical apparatus. Although high reaction efficiencies are obtained following this procedure, the retention time of cell liquor in the apparatus is frequently greater than is desirable for commercial operation. Therefore, it is preferred to provide for the continuous circulation of cell liquor through the apparatus. The circulation of cell liquor is, however, essentially independent of the circulation of the anolyte.

In a particularly preferred embodiment of the present invention, a plurality of alternating anode and cathode elements is provided with an ion exchange membrane heat sealed on each of the individual anode elements. Such an apparatus contains from about 10 to about 100 individual anode and cathode elements, with the cathode elements extending completely across the internal periphery of the apparatus, and the anode elements being arranged in an alternating staggered configuration to maximize the flow path of cell liquor through the apparatus. An anode compartment is formed in the space between the ion exchange membrane and the anode element. Preferably, this compartment is filled with an anolyte comprising an aqueous solution of sodium chloride which is circulated through inlet and outlet means provided at each anode element. The depleted brine may be recirculated, partially or completely, to the anode compartment following replenishing with additional sodium chloride. Chlorine gas generated at the anode can be continuously removed from the anode compartment.

The size and physical capacity of the apparatus should be sufficient on a commercial scale to accommodate the cell liquor produced in a typical commercial chlor-alkali diaphragm cell. Using a Hooker H-4 cell for comparison purposes, a typical cell liquor flow rate of approximately 6-10 gallons/min. requires an electrochemical apparatus having a fluid capacity of from 5-10 gallons with from about 10 to about 100 individual anode and cathode elements. Such an apparatus would operate with a fluid temperature of about 95° C. and a current density of from about 0.1 to about 1 ASI. Under such conditions, as more fully illustrated in the accompanying examples, the chlorate content of the cell liquor can be reduced by an order of magnitude, i.e. from about 0.5 g./l. to about 0.05 g./l., with a retention time of one hour or less and at a chlorate reduction efficiency of about 95%. In a commercial scale chlor-alkali facility having approximately 200 H-4 cells, for example, and capable of producing 1,000 tons per day of product, a larger, scaled-up electrochemical apparatus can be appropriately used in place of individual units for each H-4 cell.

The invention will now be further illustrated by reference to the preferred embodiment depicted in FIGS. 1 and 2.

In FIG. 1, cell liquor from a chlor-alkali diaphragm cell is introduced to electrochemical apparatus 2 through inlet means 4 and is caused to flow around inlet baffle plate 8 and through porous cathode element 10. Anode element 16 with ion exchange element 14 heat sealed on its surface is positioned in a staggered configuration to direct the liquid flow along the opposite wall or boundary of the apparatus. In this manner, the flow path of liquid through the cell is optimized permitting maximum reduction of chlorate while minimizing the volume of the apparatus. Anode compartment 26 is formed in the space between anode 16 and ion exchange element 14 and contains the anolyte solution.

The individual cathode elements are physically attached to the sides of the apparatus by means of fillet welds 12, while the anode elements are fixed to the bottom of the apparatus by means not shown. Means for withdrawing chlorine produced at the individual anode elements is provided but not shown. Inlet and outlet means for supplying and removing anolyte to the individual cathode elements are also provided but not shown.

Purified cell liquor having a significantly reduced level of sodium chlorate flows around exit baffle 24 and exits the apparatus through outlet means 6. A DC power source 18 provides current supply for the individual anode and cathode elements, through current lines 22 and 20, respectively. Preferably, sufficient current is provided to the individual cathode elements to maintain a hydrogen overpotential of less than about 300 millivolts, and most preferably less than about 150 millivolts.

Figure 2:
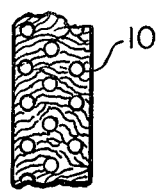
FIG. 2 is an enlarged cross-sectional view of a cathode of the electrochemical apparatus of FIG. 1.

FIG. 2 is an enlarged sectional view of cathode element 10 illustrating the individual filaments or wires comprising the cathode which are compressed, using suitable compression means, to form a highly porous, high surface area structure.

The invention will be further illustrated by the following examples which are not intended to limit it.

EXAMPLE 1

A two compartment electrolytic cell separated by a Nafion ® cationic exchange membrane is provided with a catholyte solution containing 15% NaOH, 17% NaCl and 0.6 g./l. NaClO$_3$ and an anolyte solution containing 5 moles NaCl. The anode current density was maintained at 0.1 ASI, and neither anolyte nor catholyte was circulated. The electrolysis was carried out at 95° C. The cathode compartment was packed with steel wool which was degreased and acid washed, and an iron supporting plate was used as a current collector for the steel wool. The anode used was a ruthenium dioxide-coated titanium element. The chlorate content of the catholyte was found to decrease from 0.6 g./l/ to less than about 0.01 g./l. in 90 minutes with a chlorate reduction efficiency of more than 95%. Chlorine was generated at the anode was collected and scrubbed in NaOH.

EXAMPLE 2

The procedure of Example 1 was repeated with continuous circulation of catholyte solution and without circulation of anolyte solution. The catholyte volume was 80 milliliters and the flow velocity of chlorate-containing cell liquor was 2 milliliters per minute. The chlorate level decreased from 0.6 g./l. to 0.01 g./l. with a retention time of 40 minutes and a current efficiency exceeding 95%. The anode current density was maintained at 0.15 ASI.

What is claimed is:

1. An apparatus for electrochemically removing alkali metal chlorate from chlor-alkali cell catholyte liquor, said apparatus comprising an electrochemical cell having at least one cathode element fabricated from compressed filaments or wires of a ferrous material, at least one anode element, at least one ion exchange membrane disposed between said anode and cathode elements defining an anode compartment and cathode compartment within said apparatus, inlet means for introducing chlorate-containing catholyte liquor from a chlor-alkali cell into the cathode compartment of said apparatus, outlet means for removing catholyte liquor having a reduced content of sodium chloride from said cathode compartment, inlet and outlet means for feeding and removing solution from said anode compartment, and means for removing gaseous reaction products from said apparatus.

2. The apparatus of claim 1 wherein said cathode element is a fluidized bed structure.

3. The apparatus of claim 1 wherein the ferrous material is steel.

4. The apparatus of claim 1 wherein the ferrous material is iron.

5. The apparatus of claim 1 wherein the anode element is fabricated from a metal selected from the group consisting of nickel, a noble metal or a noble metal oxide.

6. The apparatus of claim 1 wherein the ion exchange membrane is fabricated from a cationic exchange material.

7. The apparatus of claim 1 which is provided with a plurality of individual anode and cathode elements.

8. The apparatus of claim 7 which is provided with from 10 to 100 individual anode and cathode elements.

9. The apparatus of claim 8 wherein the individual cathode elements extend across the internal periphery of the apparatus and the individual anode elements are arranged in a staggered configuration relative to the catholyte liquor flow path.

10. The apparatus of claim 8 wherein the individual anode and cathode elements are provided with inlet and outlet means for feeding and removing solution from said anode compartment and separate means for removal of gaseous reaction products.

11. The apparatus of claim 1 wherein the solution in said anode compartment comprises aqueous sodium hydroxide.

12. The apparatus of claim 1 wherein the solution in said anode compartment comprises aqueous sodium chloride.

13. The apparatus of claim 12 wherein the solution in said anode compartment is continuously circulated.

14. The apparatus of claim 13 wherein the exchange membrane is heat-sealed onto the anode.

15. The apparatus of claim 1 wherein the chlor-alkali cell catholyte liquor comprises sodium hydroxide, sodium chloride and sodium chlorate.

16. The apparatus of claim 1 wherein the cathode has an impressed hydrogen overvoltage of less than about 300 millivolts.

17. The apparatus of claim 20 wherein the impressed hydrogen overvoltage of the cathode is less than about 150 millivolts.

18. An apparatus for electrochemically removing sodium chlorate from chlor-alkali cell catholyte liquor, said apparatus comprising an electrochemical cell having at least one cathode element fabricated from compressed filaments or wires of a ferrous material, at least one anode element fabricated from iron or nickel, inlet means for introducing chlorate-containing catholyte liquor from a chlor-alkali cell into said apparatus, outlet means for removing catholyte liquor having a reduced content of sodium chlorate from said apparatus, and means for removing chlorine from said apparatus, said apparatus containing a catholyte liquor comprising sodium hydroxide, sodium chloride and sodium chlorate.

19. A method for electrochemically removing alkali metal chlorate from chlor-alkali cell catholyte liquor comprising:
   (a) withdrawing catholyte liquor from a chlor-alkali cell,
   (b) feeding said catholyte liquor into the cathode compartment of an electrochemical cell containing at least one anode, at least one cathode fabricated from compressed filaments or wires of a ferrous material, and at least one ion exchange membrane disposed between said anode and cathode and defining said cathode compartment and an anode compartment,
   (c) electrolyzing said catholyte liquor, and
   (d) removing catholyte liquor having a reduced content of sodium chlorate from said cathode compartment.

20. An apparatus for electrochemically removing alkali metal chlorate from chlor-alkali cell catholyte liquor, said apparatus comprising an electrochemical cell having at least one fluidized bed cathode element fabricated from a ferrous material, at least one anode element, at least one ion exchange membrane disposed between said anode and cathode elements defining an anode compartment and cathode compartment within said apparatus, inlet means for introducing chlorate-containing catholyte liquor from a chlor-alkali cell into the cathode compartment of said apparatus, outlet means for removing catholyte liquor having a reduced content of sodium chlorate from said cathode compartment, inlet and outlet means for feeding and removing solution from said anode compartment, and means for removing gaseous reaction products from said apparatus.

* * * * *